United States Patent
Mano et al.

(10) Patent No.: US 9,874,172 B2
(45) Date of Patent: Jan. 23, 2018

(54) CONTROL DEVICE AND CONTROL METHOD FOR INTERNAL COMBUSTION ENGINES

(71) Applicant: NISSAN MOTOR CO., LTD., Yokohama-shi, Kanagawa (JP)

(72) Inventors: Tadaki Mano, Sagamihara (JP); Naonori Onoda, Kamakura (JP); Eiji Takahashi, Isehara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 325 days.

(21) Appl. No.: 14/774,770

(22) PCT Filed: Jan. 10, 2014

(86) PCT No.: PCT/JP2014/050289
§ 371 (c)(1),
(2) Date: Sep. 11, 2015

(87) PCT Pub. No.: WO2014/148067
PCT Pub. Date: Sep. 25, 2014

(65) Prior Publication Data
US 2016/0032860 A1 Feb. 4, 2016

(30) Foreign Application Priority Data
Mar. 21, 2013 (JP) ................. 2013-057493

(51) Int. Cl.
*F02D 41/30* (2006.01)
*F02D 41/40* (2006.01)
(Continued)

(52) U.S. Cl.
CPC ......... *F02D 41/3094* (2013.01); *F02D 41/04* (2013.01); *F02D 41/1454* (2013.01);
(Continued)

(58) Field of Classification Search
CPC .. F02D 41/04; F02D 41/1454; F02D 41/3094; F02D 41/40; F02D 2250/21;
(Continued)

(56) References Cited

U.S. PATENT DOCUMENTS 5,803,048 A * 9/1998 Yano ................ F02D 31/005
123/443
5,960,765 A * 10/1999 Iida .................. F02D 37/02
123/295

(Continued)

FOREIGN PATENT DOCUMENTS

GB      2491149 A   * 11/2012   ......... F02D 41/0275
JP      05280404 A  * 10/1993   ......... F02D 41/3094
(Continued)

OTHER PUBLICATIONS

U.S. Appl. No. 14/764,343, Mano et al., filed Jul. 29, 2015.
U.S. Appl. No. 14/764,359, Mano et al., filed Jul. 29, 2015.
U.S. Appl. No. 14/768,279, Mano et al., filed Aug. 17, 2015.

*Primary Examiner* — Erick Solis
*Assistant Examiner* — Anthony L Bacon
(74) *Attorney, Agent, or Firm* — Drinker Biddle & Reath LLP (57) ABSTRACT

A control device for an internal combustion engine which includes one of the port injection fuel injection valve and the cylinder injection fuel injection valve that serves as a main fuel injection valve, the other of the fuel injection valves that serves as an auxiliary fuel injection valve arranged to be auxiliarily operated in a specified engine driving condition, and which is configured to perform a switching of an injection and a stop of the auxiliary fuel injection valve in accordance with an engine driving condition, the control device includes: the control device being configured to switch the injection and the stop of the auxiliary fuel injection valve in a state where an air-fuel ratio by an (Continued)

injection amount of the fuel by the main fuel injection valve is thicker than a stoichiometric air-fuel ratio.

6 Claims, 4 Drawing Sheets

(51) Int. Cl.
*F02D 41/04* (2006.01)
*F02D 41/14* (2006.01)

(52) U.S. Cl.
CPC .......... *F02D 41/40* (2013.01); *F02D 2250/21* (2013.01); *Y02T 10/44* (2013.01)

(58) Field of Classification Search
CPC .... F02D 19/06; F02D 19/0607; F02D 19/061; F02D 19/0613; F02D 19/0615
See application file for complete search history.

(56) References Cited

U.S. PATENT DOCUMENTS

| | | | |
|---|---|---|---|
| 5,970,947 A * | 10/1999 | Iida | F02D 41/1401 123/295 |
| 2006/0037583 A1 | 2/2006 | Tanaka | |
| 2007/0215112 A1* | 9/2007 | Brehob | F02D 17/02 123/431 |
| 2012/0277981 A1* | 11/2012 | Nakayama | F02D 19/0613 701/104 |

FOREIGN PATENT DOCUMENTS

| | | |
|---|---|---|
| JP | H06-193496 A | 7/1994 |
| JP | H11-351011 A | 12/1999 |
| JP | 2006-057594 A | 3/2006 |

* cited by examiner

FIG.1

CONTROL DEVICE AND CONTROL METHOD FOR INTERNAL COMBUSTION ENGINES

TECHNICAL FIELD

This invention relates to a control device and a control method for an internal combustion engine which includes a fuel injection valve for port injection (port injection fuel injection valve) that is arranged to inject fuel to an intake port, and a fuel injection valve for cylinder injection (cylinder injection fuel injection valve) that is arranged to inject the fuel to a combustion chamber, and which is arranged to switch injection and stop of one of the fuel injection valves in accordance with an engine driving state.

BACKGROUND ART

A patent document 1 discloses an internal combustion engine which includes a fuel injection device including a port injection fuel injection valve arranged to inject fuel to an intake port, and a cylinder injection fuel injection valve arranged to inject the fuel directly into a combustion chamber, and which is arranged to appropriately switch these in accordance with an engine driving state. In this patent document 1, a driving region determined by the load and the rotation speed of the engine is divided into three regions of a stratified lean combustion region of a low speed and low load side, a homogeneous lean combustion region of a middle speed and middle load, and a homogeneous stoichiometric combustion region of a high speed and high load side. In the stratified lean combustion region, the cylinder injection is performed by using the cylinder injection fuel injection valve. In the homogeneous lean combustion region, the intake port injection is performed by using the port injection fuel injection valve. In the homogeneous stoichiometric combustion region, the fuel injection is performed by using both of the fuel injection valves.

In this case, the patent document 1 relates to an ignition timing control in which the ignition timing is corrected in accordance with a ratio between the fuel injection amounts of the intake port injection and the cylinder injection. When the variation amount of the appropriate ignition timing according to the variation of the injection amount rate is equal to or greater than a predetermined amount, a width of the variation of the injection amount rate is restricted. That is, for example, even when the target injection amount rate is varied from 0% to 100%, the actual variation of the injection amount rate is performed in a stepped manner.

In the art of the patent document 1, for example, in a case where the fuel injection of the other of the fuel injection valves which is in the stopped state is started in accordance with the variation of the engine driving condition during the driving by the fuel injection from one of the fuel injection valves as described above, the fuel injection of the other of the fuel injection valves is started from the fuel injection of the small amount so as to gradually vary the injection amount rate. However, in the fuel injection valve which is opened in response to the driving pulse signal, a minimum fuel injection amount which can be measured by the driving pulse signal is determined. Accordingly, it is not possible to inject the fuel of the amount which is smaller than the minimum fuel injection amount.

Consequently, even if the injection of the other of the fuel injection valves is started from the extremely small amount during the fuel injection of one of the fuel injection valves, it is not possible to avoid that the fuel injection amount is increased and decreased by the minimum fuel injection amount in the stepped manner. Besides, there is a difference of the transfer delay to the combustion chamber between the intake port injection and the cylinder injection. Accordingly, it is extremely difficult to cancel the above-described stepped increase and decrease of the minimum fuel injection amount, by the injection amount of the one of the fuel injection valves.

PRIOR ART DOCUMENT

Patent Document

Patent Document 1: Japanese Patent Application Publication No. 2006-57594

SUMMARY OF THE INVENTION

In this invention, a control device for an internal combustion engine which includes a port injection fuel injection valve arranged to inject fuel to an intake port, a cylinder injection fuel injection valve arranged to inject the fuel to a combustion chamber, one of the port injection fuel injection valve and the cylinder injection fuel injection valve that serves as a main fuel injection valve, the other of the port injection fuel injection valve and the cylinder injection fuel injection valve that serves as an auxiliary fuel injection valve arranged to be auxiliarily operated in a specified engine driving condition, and which is configured to perform a switching of an injection and a stop of the auxiliary fuel injection valve in accordance with an engine driving condition, the control device includes: the control device being configured to switch the injection and the stop of the auxiliary fuel injection valve in a state where an air-fuel ratio by an injection amount of the fuel by the main fuel injection valve is thicker than a stoichiometric air-fuel ratio.

For example, in a case where the air-fuel ratio becomes thicker than the stoichiometric air-fuel ratio by the fuel injection amount of the main fuel injection valve when the injection of the auxiliary fuel injection valve is started during the driving of the engine by the fuel injection of the main fuel injection valve, the increase of the torque is hardly generated even when the total fuel amount is increased by the injection start of the auxiliary fuel injection valve (for example, the injection start by the above-described minimum fuel injection amount). That is, in a state where the air-fuel ratio is already rich, the generated torque is dependent on the air amount within the cylinder. Accordingly, the air-fuel ratio becomes further rich by the increase of the total fuel amount. The fuel cooling function by the heat of vaporization is increased. However, the torque is hardly increased. Consequently, the torque step feeling is not provided to the driver.

It is also similar to a case where the injection of the auxiliary fuel injection valve is stopped from a state where the fuel injection of both of the main fuel injection valve and the auxiliary fuel injection valve are performed. The torque is hardly decreased even when, for example, the fuel injection amount is decreased by the minimum fuel injection amount of the auxiliary fuel injection valve in the stepped manner as long as the air-fuel ratio by the fuel injection amount of the main fuel injection valve (that is, the air-fuel ratio after the stop of the auxiliary fuel injection valve) is thicker than the stoichiometric air-fuel ratio. Accordingly, the torque step feeling is not provided to the driver.

By this invention, the increase and the decrease of the torque at the start or the stop of the injection of the auxiliary fuel injection valve is suppressed. The torque step feeling according to the switching is not provided to the driver.

DESCRIPTION OF EMBODIMENTS

Hereinafter, one embodiment of the present invention is illustrated based on the drawings.

Figure 1:
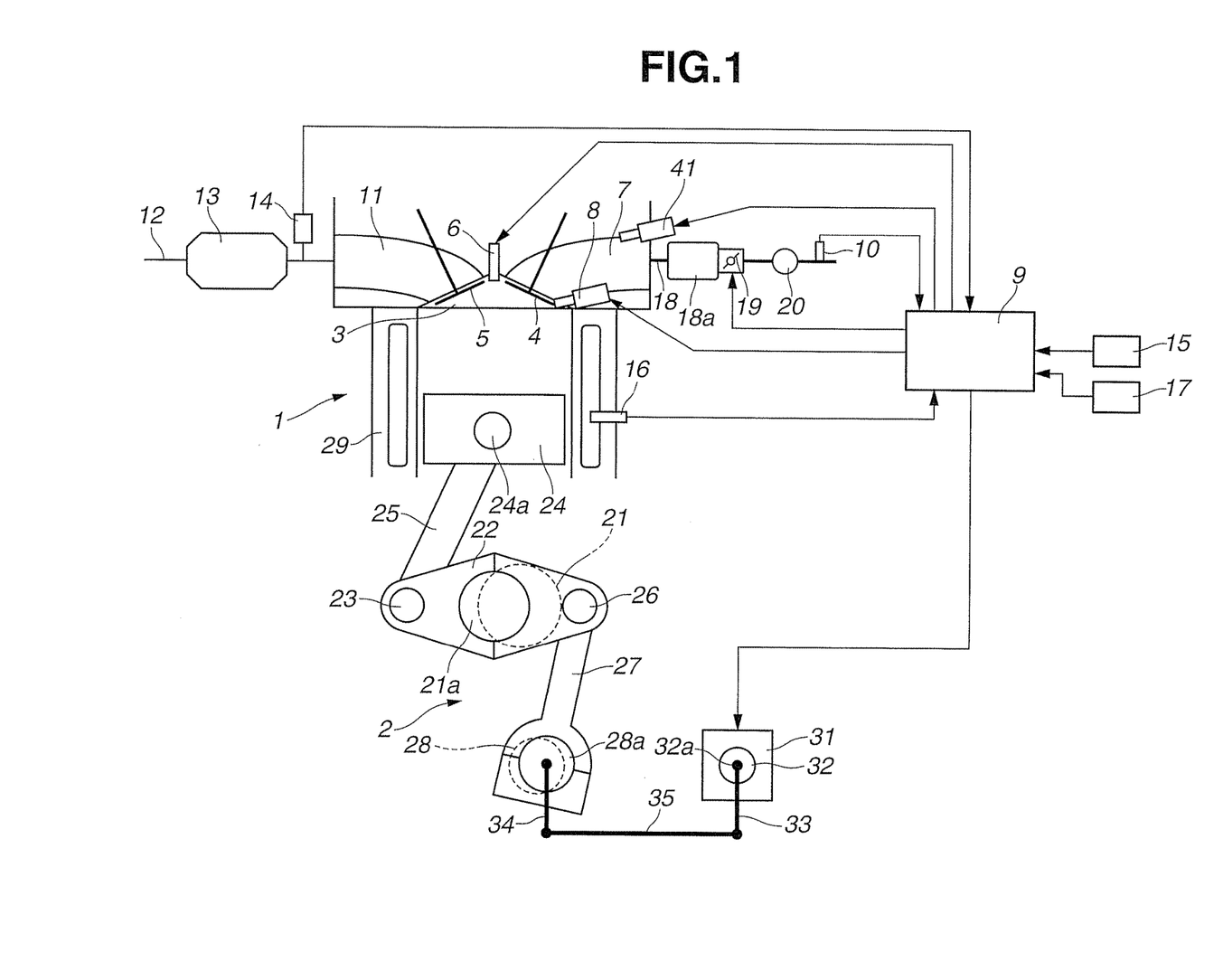
FIG. 1 is a structure explanation view showing a system structure of a control device according to one embodiment of the present invention.

FIG. 1 shows a system configuration of an internal combustion engine 1 for a vehicle to which the present invention is applied. This internal combustion engine 1 is a four stroke cycle spark ignition internal combustion engine which has a turbocharger, and which includes a variable compression ratio mechanism 2 using, for example, a multi-link type piston crank mechanism. The internal combustion engine 1 includes a pair of intake valves 4 and a pair of exhaust valves 5 which are disposed on a wall surface of a ceiling of a combustion chamber 3; and an ignition plug 6 which is disposed at a central portion surrounded by these intake valves 4 and exhaust valves 5.

There is a fuel injection valve 8 for cylinder injection (cylinder injection fuel injection valve 8) at a lower portion of the intake port 7 arranged to be opened and closed by the intake valve 4. Moreover, a fuel injection valve 41 for port injection (port injection fuel injection valve 41) is disposed to the intake port 7. The port injection fuel injection valve 41 is arranged to inject the fuel toward the intake port 7. These cylinder injection fuel injection valve 8 and the port injection fuel injection valve 41 are electromagnetic or piezo-electric valves which are arranged to be opened by being applied with a driving pulse signal. These cylinder injection fuel injection valve 8 and the port injection fuel injection valve 41 are arranged to inject the fuel of an amount which is substantially proportional to a pulse width of the driving pulse signal.

An electrically controlled type throttle valve 19 is disposed on an upstream side of a collector portion 18a of an intake passage 18 connected to the intake port 7. An opening degree of the electrically controlled type throttle valve 19 is controlled by a control signal from an engine controller 9. Moreover, there is a compressor 20 of a turbocharger which is disposed on an upstream side of the electrically controlled throttle valve 19. Furthermore, there is an air flow meter 10 which is disposed on an upstream side of this compressor 20, and which is arranged to sense an intake air quantity.

Moreover, a catalyst device 13 which is constituted by a three-way catalyst is disposed in the exhaust passage 12 connected to the exhaust port 11. Furthermore, there is an air-fuel ratio sensor 14 which is disposed on an upstream side of the catalyst device 13, and which is arranged to sense an air-fuel ratio.

The engine controller 9 is arranged to receive detection signals of sensors such as the air flow meter 10, the air-fuel ratio sensor 14, a crank angle sensor 15 arranged to sense an engine speed, a water temperature sensor 16 arranged to sense a coolant temperature, and an accelerator opening degree sensor 17 arranged to sense a depression amount of an accelerator pedal operated by a driver. The engine controller 9 is configured to appropriately control fuel injection amounts and injection timings by the fuel injection valves 8 and 41, an ignition timing by the ignition plug 6, an opening degree of a throttle valve 19, and so on.

On the other hand, the variable compression ratio mechanism 2 uses a known multi-link piston crank mechanism. The variable compression ratio mechanism 2 includes a lower link 22 rotatably supported by a crank pin 21a of a crank shaft 21; an upper link 25 connecting an upper pin 23 provided at one end portion of this lower link 22, and a piston pin 24a of a piston 24; a control link 27 having one end connected with a control pin 26 provided on the other end portion of the lower link 22; and a control shaft 28 swingably supporting the other end of this control link 27. The crank shaft 21 and the control shaft 28 are rotatably supported through a bearing structure (not shown) within a crank case provided at a lower portion of a cylinder block 29. The control shaft 28 includes an eccentric shaft portion 28a whose a position is varied in accordance with a pivot movement of the control shaft 28. One end portion of the control link 27 is rotatably mounted in this eccentric shaft portion 28a. In the above-described variable compression ratio mechanism 2, an upper dead center of the piston 24 is varied in upward and downward directions in accordance with the pivot movement of the control shaft 28, so that a mechanical compression ratio is varied.

Moreover, an electric motor 31 is disposed at a lower portion of a cylinder block 29. The electric motor 31 serves as a driving mechanism configured to control to vary a compression ratio of the variable compression ratio mechanism 2. The electric motor 31 includes a rotation center shaft which extends in parallel to the crank shaft 21. A speed reduction device 32 is connected to be arranged in series with this electric motor 31 in the axial direction. This speed reduction device 32 is, for example, a wave gear mechanism having a large speed reduction ratio. A speed reduction device output shaft 32a of this speed reduction device 32 is positioned coaxially with an output shaft (not shown) of the electric motor 31. Accordingly, the speed reduction device output shaft 32a and the control shaft 28 are positioned in parallel with each other. A first arm 33 fixed to the speed reduction device output shaft 32a and a second arm 34 fixed to the control shaft 28 are connected with each other by an intermediate link 35 so that the speed reduction device output shaft 32a and the control shaft 28 are interlockingly pivoted with each other.

That is, when the electric motor 31 is rotated, the speed of the rotation is largely decreased by the speed reduction device 32, and an angle of the speed reduction device output shaft 32a is varied. The pivot movement of this speed reduction device output shaft 32a is transmitted from the first arm 33 through the intermediate link 35 to the second arm 34, so that the control shaft 28 is pivoted. With this, as described above, the mechanical compression ratio of the internal combustion engine 1 is varied. Besides, in an example shown in the drawings, the first arm 33 and the second arm 34 extend in the same direction. Accordingly, for example, when the speed reduction device output shaft 32a is pivoted in a clockwise direction, the control shaft 28 is also pivoted in the clockwise direction. However, it is possible to constitute a link mechanism so that the speed reduction device output shaft 32*a* and the control shaft 28 are pivoted in the opposite directions.

A target compression ratio of the variable compression ratio mechanism 2 is set in the engine controller 9 based on the engine driving conditions (for example, a desired load and the engine speed). The electric motor 31 is drivingly controlled so as to attain this target compression ratio.

Moreover, in the present invention, the variable compression ratio mechanism 2 is not necessarily needed. It may be a fixed compression ratio mechanism.

Figure 2:
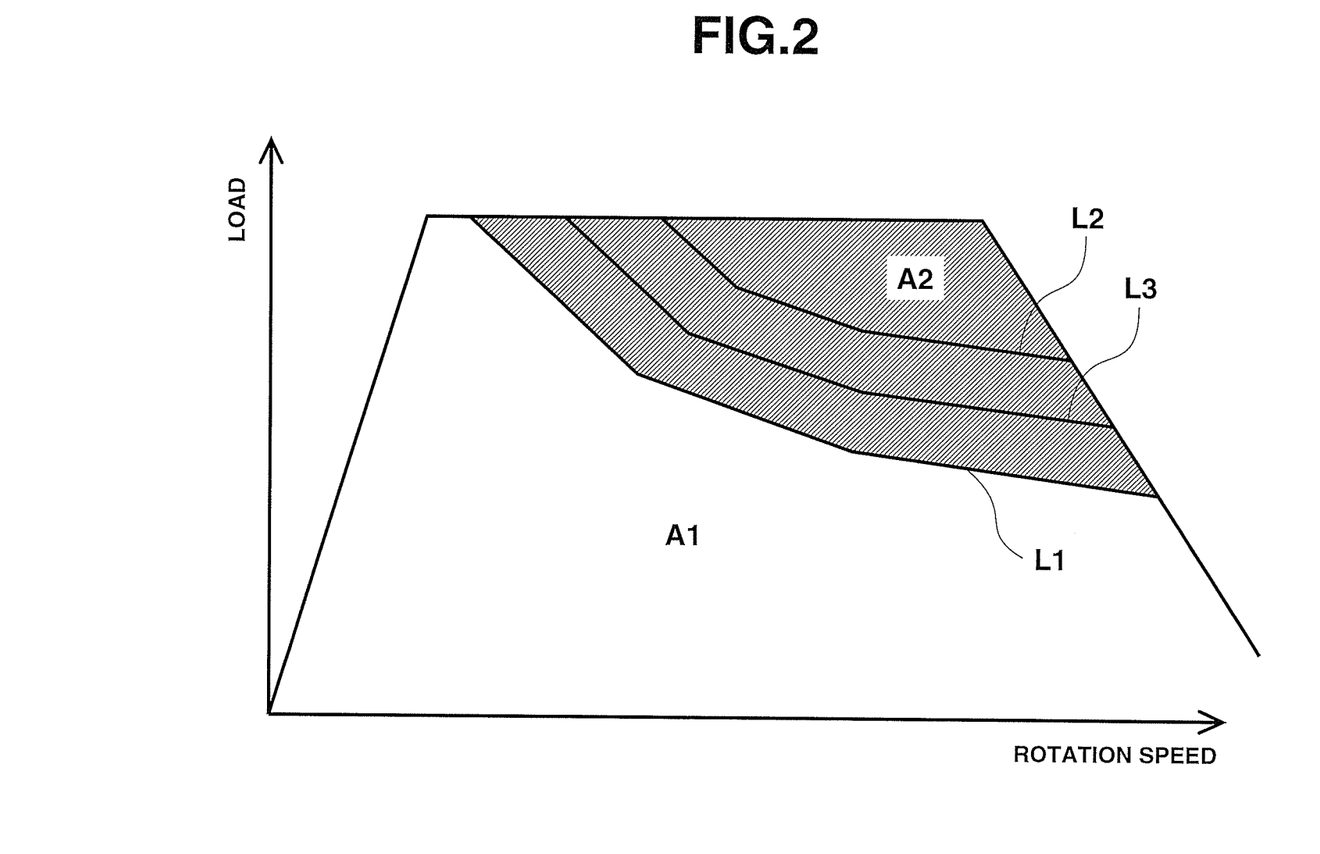
FIG. 2 is a characteristic view showing a switching line of injection/stop of a port injection fuel injection valve in a driving region of an internal combustion engine according to the embodiment.

FIG. 2 shows a driving region of the internal combustion engine 1 by using the load and the rotation speed of the internal combustion engine 1 which serve as parameters. A line shown by a symbol L1 in the drawing shows a boundary between a driving region A1 in which the target air-fuel ratio is a stoichiometric air-fuel ratio, and a driving region A2 which is on the high speed high load side, and in which the target air-fuel ratio is an output air-fuel ratio that is thicker (richer) than the stoichiometric air-fuel ratio. Besides, in the stoichiometric air-fuel ratio region A1, a fuel supply amount is basically controlled to target the stoichiometric air-fuel ratio by a known air-fuel ratio feedback control based on the detection signals of the air-fuel ratio sensor 14. On the other hand, in the output air-fuel ratio region A2, the fuel supply amount is basically controlled by an open loop control. Moreover, in the output air-fuel ratio region A2, the target air-fuel ratio becomes richer toward the high speed high load side.

In this case, in this embodiment, the cylinder injection fuel injection valve 8 is used as a main fuel injection valve. The cylinder injection fuel injection valve 8 is driven in an entire region including both the driving regions A1 and A2. On the other hand, the port injection fuel injection valve 41 serves as an auxiliary fuel injection valve arranged to be auxiliarily (secondarily) operated in a specified driving condition. That is, in the stoichiometric air-fuel ratio region A1, basically, the entire necessary amount of the fuel is supplied and injected only by the cylinder injection fuel injection valve 8 which is the main fuel injection valve. The port injection fuel injection valve 41 which is the auxiliary fuel injection valve is stopped. However, in the high speed high load region in which the necessary fuel amount that is needed during a unit time period is large (that is, when an air amount per unit time period is large), it is not possible to supply the necessary fuel amount only by the cylinder injection fuel injection valve 8. The fuel supply by the port injection fuel injection valve 41 is additionally needed.

A line shown by a symbol L2 in FIG. 2 shows a driving condition corresponding to the maximum injection amount of the cylinder injection fuel injection valve 8 which is the main fuel injection valve. As shown in the drawing, it includes an entire region of the stoichiometric air-fuel ratio region A1 and a part of a region on the low speed low load side in the output air-fuel ratio region A2. Accordingly, in these regions, it is possible to satisfy (cover) the necessary fuel amount only by the cylinder injection fuel injection valve 8. However, on the high speed and high load side of this line L2, the fuel amount is insufficient only by the cylinder injection fuel injection valve 8. Accordingly, the additional fuel injection is performed by the port injection fuel injection valve 41 which is the auxiliary fuel injection valve. In this embodiment, a boundary on which the injection and the stop of this port injection fuel injection valve 41 are switched is set to an intermediate portion between the two boundary lines L1 and L2, as shown by a switching line L3. That is, the switching line L3 is positioned on the high speed high load side (that is, in the output air-fuel ratio region A2) of the boundary line L1 between the stoichiometric air-fuel ratio region A1 and the output air-fuel ratio region A2. Moreover, simultaneously, the switching line L3 is set on the low speed and low load side of the maximum injection amount corresponding boundary line L2 for providing an appropriate margin to the maximum injection amount of the cylinder injection fuel injection valve 8. Besides, in the actual control, there is an appropriate hysteresis between the start and the end of the actuation of the port injection fuel injection valve 41. In FIG. 2, for simplifying the explanation, both of the start and the end is shown as one switching line L3.

In the region on the high speed and high load side of the switching line L3, the fuel amount supplied by the cylinder injection fuel injection valve 8 is constant. The deficient amount of the necessary fuel amount is supplied and injected from the port injection fuel injection valve 41.

Figure 3:
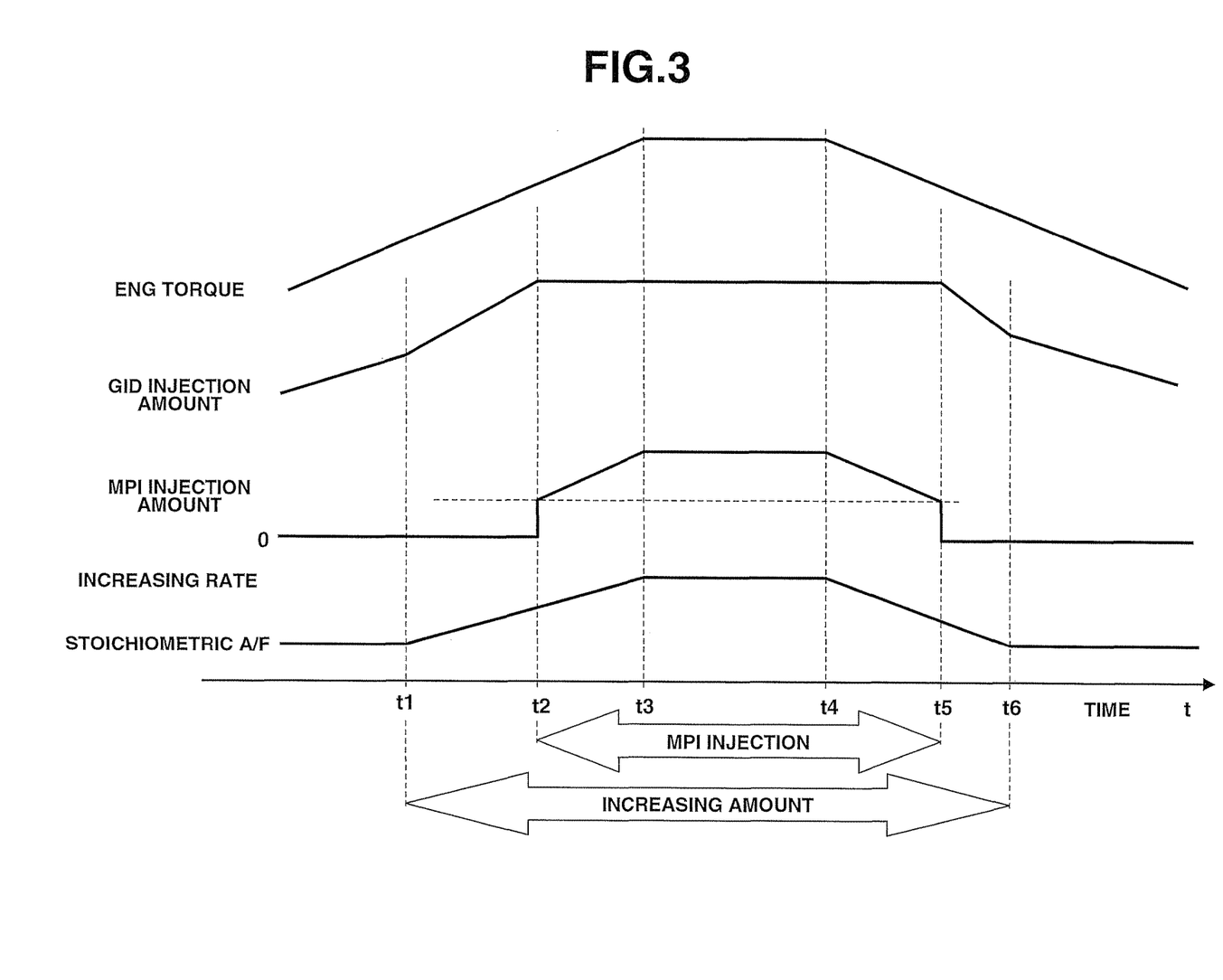
FIG. 3 is a time chart for illustrating a switching when it passes across a switching line.

FIG. 3 shows a time chart in a case where the engine driving condition passes across the switching line L3 by the acceleration and deceleration operation of the driver, and the injection of the port injection fuel injection valve 41 is started and stopped. Besides, in FIG. 3 and so on, "GDI" of the drawings means the cylinder injection by the cylinder injection fuel injection valve 8. "MPI" means a port injection by the port injection fuel injection valve 41.

A first half of this time chart shows a state in which the desired torque of the internal combustion engine is increased by the acceleration operation of the driver. The engine driving condition is within the stoichiometric air-fuel ratio region A1 until time t1. Accordingly, the injection amount of the cylinder injection fuel injection valve 8 is increased. However, the fuel increase rate is maintained to 1 in a case where the stoichiometric air-fuel ratio is set to 1. At time t1, it passes across the boundary line L1 shown in FIG. 2 to shift from the stoichiometric air-fuel ratio region A1 to the output air-fuel ratio region A2. Accordingly, the injection amount of the cylinder injection fuel injection valve 8 is increased after that time. Moreover, the fuel increase rate is gradually increased. Then, it passes across the switching line L3 at time t2. Consequently, the fuel injection by the port injection fuel injection valve 41 is started. Simultaneously, the increase of the injection amount of the cylinder injection fuel injection valve 8 is stopped. At this time, the port injection fuel injection valve 41 starts the fuel injection by the minimum injection amount. However, the fuel injection valve 41 has a fixed (inherent) minimum fuel injection amount, as described above. Accordingly, this fuel supply by at least the minimum fuel injection amount is performed at a timing immediately after the start. Consequently, when the fuel injected from this port injection fuel injection valve 41 to the intake port 7 reaches the combustion chamber 3, the total fuel amount is increased in a stepped manner.

However, when the fuel injection of the port injection fuel injection valve 41 is started in this way, the engine driving condition is within the output air-fuel ratio region A2. The air-fuel ratio is already the output air-fuel ratio which is thicker than the stoichiometric air-fuel ratio, only by the cylinder injection fuel injection valve 8. Accordingly, even when the total fuel amount is increased in the stepped manner, the torque increase is hardly generated. As described above, in a state where the air-fuel ratio is already rich, the generated torque is dependent on the air amount within the cylinder. Accordingly, the air-fuel ratio becomes further rich state by the increase of the total fuel amount. Consequently, the fuel cooling function is increased by the heat of vaporization. However, the torque is hardly increased. Therefore, the torque step feeling is not provided to the driver.

In the example shown in the drawing, the acceleration operation is further continued from time t2 to time t3. Accordingly, the injection amount of the port injection fuel injection valve 41 is increased in accordance with the increase of the desired torque.

The acceleration is finished at time t3. The deceleration operation is started from time t4. The injection amount of the port injection fuel injection valve 41 is gradually decreased from time t4 to time t5 in accordance with this deceleration operation. The injection amount of the cylinder injection fuel injection valve 8 is constant. At time t5, the engine driving condition passes across the switching line L3. Accordingly, the fuel injection by the port injection fuel injection valve 41 is stopped. At this time, the fuel injection amount is decreased in the stepped manner by at least the fuel amount corresponding to the minimum fuel injection amount. However, similarly to the start of the injection, the air-fuel ratio is the output air-fuel ratio which is thicker than the stoichiometric air-fuel ratio, only by the cylinder injection fuel injection valve 8. Accordingly, the decrease of the torque is small. The torque step feeling is not provided to the driver.

That is, the injection and the stop of the port injection fuel injection valve 41 is switched while the fuel increase is performed by the cylinder injection fuel injection valve 8 which is the main fuel injection valve, as shown in a lowermost portion of FIG. 3. With this, the sensitivity of the torque with respect to the stepped increase and the stepped decrease of the fuel amount corresponding to at least the minimum fuel injection amount is decreased. It is possible to suppress the torque step feeling.

In this way, in this embodiment, the cylinder injection fuel injection valve 8 is the main fuel injection valve. In a high speed high load region in which that injection amount of the cylinder injection fuel injection valve 8 is insufficient, the port injection fuel injection valve 41 compensates for the fuel amount. Accordingly, it is possible to use the cylinder injection fuel injection valve 8 having a relatively small capacity, with respect to the wide variation of the air quantity (that is, the desired fuel amount) by the supercharging. For example, it is possible to easily perform the injection amount control in the idling state. Moreover, it is possible to use the injection valve 41 having the relatively large minimum fuel injection amount as the port injection fuel injection valve 41.

Figure 4:
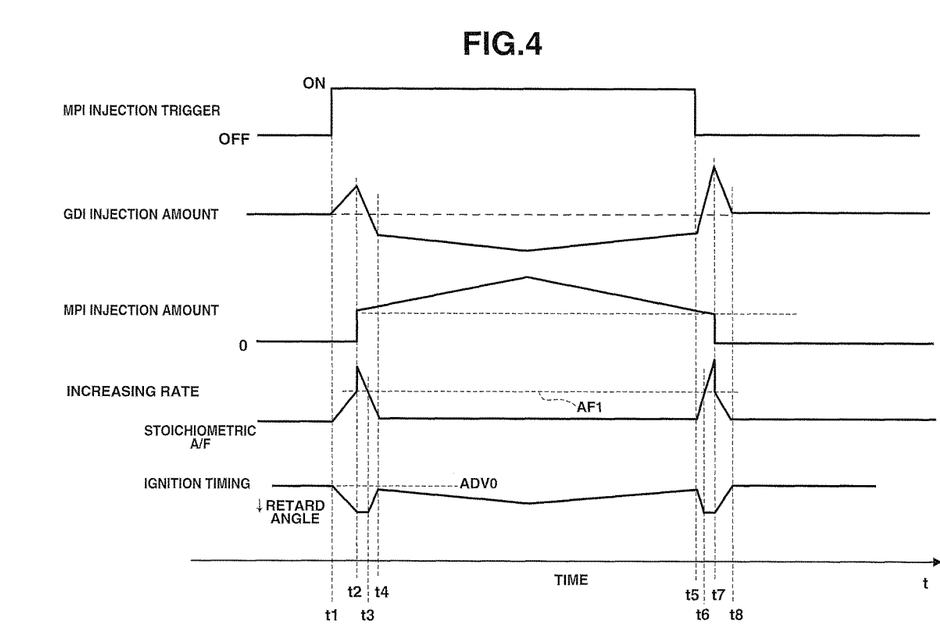
FIG. 4 is a time chart for illustrating the switching according to a switching request of the port injection fuel injection valve in the stoichiometric air-fuel ratio region.

Next, the operations in a case where it is switched from the fuel injection only by the cylinder injection fuel injection valve 8 to the fuel injection by both of the cylinder injection fuel injection valve 8 and the port injection fuel injection valve 41 during the driving within the stoichiometric air-fuel ratio region A1, for varying the combustion is explained by using a time chart of FIG. 4.

In this case, it is assumed that the operation of the fuel injection is switched independently of the acceleration/deceleration operation of the driver. Accordingly, the air quantity is constant. In a case where the switching is performed within the stoichiometric air-fuel ratio region A1 as shown in FIG. 4, the fuel is increased for the switching so that the switching is performed in a state where the air-fuel ratio is set to a value thicker than the stoichiometric air-fuel ratio.

That is, until time t1 of FIG. 4, the driving is performed at the stoichiometric air-fuel ratio set only by the cylinder injection fuel injection valve 8. The port injection fuel injection valve 41 is stopped. At the time t1, a trigger signal to request the operation of the port injection fuel injection valve 41 is switched to the ON state. At this time, the switching is not immediately performed. The injection amount of the cylinder injection fuel injection valve 8 is increased so that the air-fuel ratio is brought to the rich state. Moreover, the ignition timing is retarded in accordance with the fuel increase amount so that the increase of the torque according to the switching to the rich state is suppressed. Then, at the time t2 at which the air-fuel ratio becomes a predetermined level AF1, the switching is performed, that is, the injection of the port injection fuel injection valve 41 is started. At this time, the fuel of at least the minimum fuel injection amount is injected from the port injection fuel injection valve 41, as described above. The air-fuel ratio already becomes rich. Accordingly, the torque step according to the stepped increase of the total fuel amount becomes relatively small. After the start of the injection of the port injection fuel injection valve 41, the injection amount of the cylinder injection fuel injection valve 8 becomes small. From time t4 to time t5, at least one of the injection amounts of the fuel injection valves is controlled by the feedback control based on the detection signal of the air-fuel ratio sensor 14, so that the air-fuel ratio is maintained to the stoichiometric air-fuel ratio by the fuel injections by the both of the cylinder injection fuel injection valve 8 and the port injection fuel injection valve 41 at an appropriate sharing rate. From time t4 to time t5, the air-fuel ratio may be maintained to the stoichiometric air-fuel ratio by the open loop control.

The ignition timing is gradually retarded so as to correspond to the fuel increase (the switching to the rich state) from time t1 to time t2. However, the increase of the torque according to the increase of the total fuel amount is hardly generated, during a time period from time t2 to time t3 during which the air-fuel ratio becomes richer than the predetermined level AF1. Accordingly, the ignition timing becomes constant. Then, the torque is decreased in accordance with the decrease of the fuel increase amount rate, during a time period from time t3 to time t4 during which the air-fuel ratio becomes a value nearer to the stoichiometric air-fuel ratio than to the predetermined level AF1. Accordingly, the retarded ignition timing until now is advanced so as to cancel this decrease of the torque. After time t4, the ignition timing is returned to the ignition timing corresponding to the total fuel amount corresponding to the stoichiometric air-fuel ratio. The appropriate ignition timings are different between the cylinder injection by the cylinder injection fuel injection valve 8, and the port injection by the port injection fuel injection valve 41. Accordingly, the ignition timing becomes the slightly retard angle side relative to the ignition timing ADVO before the timing t1.

A process after time t5 shows a process in which the injection of the port injection fuel injection valve 41 is stopped, and the operation is returned to the driving only by the cylinder fuel injection valve 8. When the injection request signal (the trigger signal) of the port injection fuel injection valve 41 is brought to the OFF state at time t5, the fuel amount by the cylinder injection fuel injection valve 8 is increased prior to the actual switching so that the air-fuel ratio is switched to the rich state. At this time, the fuel amount is increased so that the air-fuel ratio becomes the air-fuel ratio (the predetermined level AF1) which is thicker than the stoichiometric air-fuel ratio by the injection amount only by at least the cylinder injection fuel injection valve 8. Moreover, the ignition timing is retarded so as to cancel the torque increase according to the switching of the air-fuel ratio to the rich state. Besides, during a time period from time t6 to time t7, the ignition timing becomes constant for the reasons similar to that of the above-described case during the time period from time t2 to time t3. Then, the port injection fuel injection valve 41 is stopped at time t7 at which the air-fuel ratio becomes the rich state of the above-described level. Even when the total fuel amount is decreased in the stepped manner in accordance with this stop of the port injection fuel injection valve 41, the air-fuel ratio is maintained to the air-fuel ratio (the rich state which is equal to or greater than the predetermined level AF1 at which the influence on the torque is small) which is thicker than the stoichiometric air-fuel ratio. Accordingly, the torque step according to the decrease of the total fuel amount becomes relatively small. The injection amount of the cylinder injection fuel injection valve 8 is gradually decreased after the switching (the stop of the port injection fuel injection valve 41). The ignition timing is returned to the normal ignition timing in accordance with the decrease of the injection amount of the cylinder injection fuel injection valve 8. After time t8, the driving is performed at the stoichiometric air-fuel ratio set only by the cylinder injection fuel injection valve 8.

In this way, even when the operation of the fuel injection is switched during the driving within the stoichiometric air-fuel ratio region A1, it is possible to switch the fuel injection valves 8 and 41 while suppressing the torque step.

Besides, it is possible to gradually perform the increase and the decrease of the injection amount by the cylinder injection fuel injection valve 8 during the time period from time t1 to time t4, and during the time period from time t5 to time t8 so as not to feel the torque step feeling. Accordingly, the adjustment of the torque by the retard of the ignition timing is not necessarily needed.

Moreover, in the example of FIG. 4, the injection operation is switched from the fuel injection only by the cylinder injection fuel injection valve 8 to the fuel injections by both of the cylinder injection fuel injection valve 8 and the port injection fuel injection valve 41. Furthermore, it is possible to switch to the fuel injection only by the port injection fuel injection valve 41.

The invention claimed is:

1. A control device for an internal combustion engine which includes a port injection fuel injection valve arranged to inject fuel to an intake port, a cylinder injection fuel injection valve arranged to inject the fuel to a combustion chamber, one of the port injection fuel injection valve and the cylinder injection fuel injection valve that serves as a main fuel injection valve, the other of the port injection fuel injection valve and the cylinder injection fuel injection valve that serves as an auxiliary fuel injection valve arranged to be auxiliarily operated in a specified engine driving condition, and which is configured to perform a switching of an injection and a stop of the auxiliary fuel injection valve in accordance with an engine driving condition, the control device comprising:

the control device being configured to switch the injection and the stop of the auxiliary fuel injection valve in a state where an air-fuel ratio by an injection amount of the fuel by the main fuel injection valve is thicker than a stoichiometric air-fuel ratio.

2. The control device for the internal combustion engine as claimed in claim 1, wherein the control device is configured to switch the injection and the stop of the auxiliary fuel injection valve in a higher speed and higher load side relative to a boundary between a driving region in which a target air-fuel ratio of the internal combustion engine is an output air-fuel ratio that is thicker than the stoichiometric air-fuel ratio, and a driving region in which the target air-fuel ratio is the stoichiometric air-fuel ratio.

3. The control device for the internal combustion engine as claimed in claim 1, wherein the control device is configured to control the air-fuel ratio to a value that is thicker than the stoichiometric air-fuel ratio by the increase of the fuel injection amount of the main fuel injection valve when the switching of the injection and the stop of the auxiliary fuel injection valve is requested.

4. The control device for the internal combustion engine as claimed in claim 3, wherein the ignition timing is retarded in accordance with the increase of the fuel injection amount.

5. The control device for the internal combustion engine as claimed in claim 1, wherein the main fuel injection valve performs the fuel injection in an entire region of the driving region.

6. A control method for an internal combustion engine which includes a port injection fuel injection valve arranged to inject fuel to an intake port, a cylinder injection fuel injection valve arranged to inject the fuel to a combustion chamber, one of the port injection fuel injection valve and the cylinder injection fuel injection valve that serves as a main fuel injection valve, the other of the port injection fuel injection valve and the cylinder injection fuel injection valve that serves as an auxiliary fuel injection valve arranged to be auxiliarily operated in a specified engine driving condition, and which is configured to perform a switching of an injection and a stop of the auxiliary fuel injection valve in accordance with an engine driving condition, the control method comprising:

switching the injection and the stop of the auxiliary fuel injection valve in a state where an air-fuel ratio by an injection amount of the fuel by the main fuel injection valve is thicker than a stoichiometric air-fuel ratio.

\* \* \* \* \*